H. I. SHIRE & H. D. BEAN.
ELECTRICAL MEASURING INSTRUMENT.
APPLICATION FILED NOV. 20, 1908.
1,032,786.
Patented July 16, 1912.
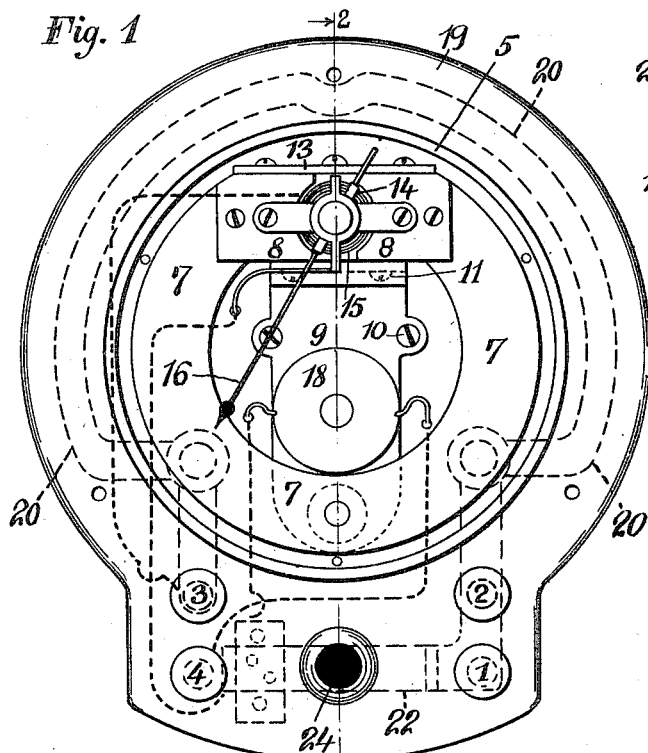
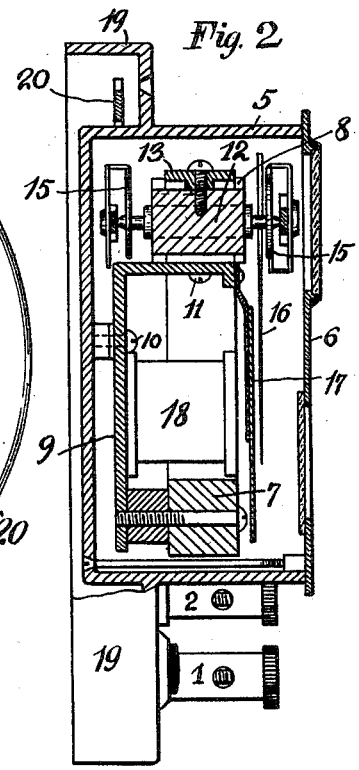
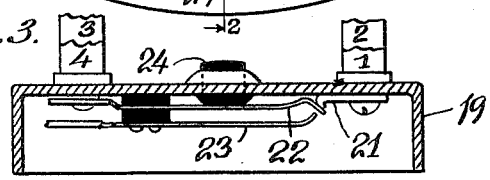
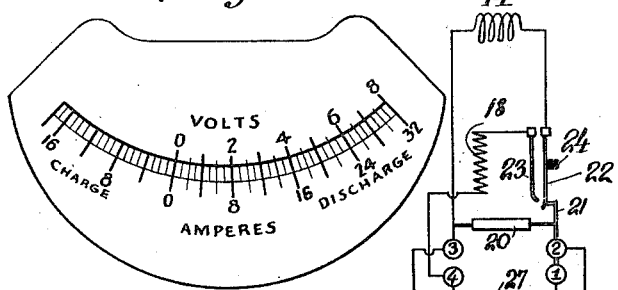
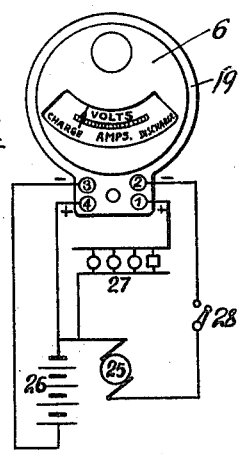
Witnesses
Geo. A. Hoffman
Edmund O. Duboca
Inventors.
Harry I. Shire.
Horace D. Bean.
By his Attorneys
Edwards, Sager & Wooster.
COLUMBIA PLANOGRAPH CO., WASHINGTON, D. C.

HARRY I. SHIRE, OF JAMAICA, NEW YORK, AND HORACE D. BEAN, OF PENACOOK, NEW HAMPSHIRE, ASSIGNORS TO ROLLER-SMITH COMPANY, A CORPORATION OF NEW YORK.

ELECTRICAL MEASURING INSTRUMENT.

1,032,786.     Specification of Letters Patent.     Patented July 16, 1912.

Application filed November 20, 1908. Serial No. 463,692.

*To all whom it may concern:*

Be it known that we, HARRY I. SHIRE and HORACE D. BEAN, citizens of the United States, residing at Jamaica, Long Island, county of Queens, and State of New York, and Penacook, county of Merrimack, State of New Hampshire, respectively, have invented certain new and useful Improvements in Electrical Measuring Instruments, of which the following is a full, clear, and exact specification.

Our invention relates to electrical measuring instruments, and particularly to an arrangement of elements and connections in relation to the instrument and to an outside circuit whereby readings of voltage and current values may be made with the same instrument.

It has been customary to provide two separate instruments where measurement of current and voltage is desired, one for the voltage measurement and the other for the measurement of current in the circuit, and one object of our invention is to attain these results by the use of one instrument only. One instance of particular advantage in utilizing one instrument for these purposes is in the case of automobiles wherein a single instrument has great advantage in occupying a minimum amount of space and requiring a less amount of care and attention than when two instruments are used, and also obtaining the advantage of greater simplicity. It is now common to provide automobiles with an auxiliary electric generator driven by energy derived from the engine, and which is automatically governed to generate an approximately constant voltage and which serves to supply various translating devices such as electric lamps, heaters, electric bells and various other devices. A storage battery is also customarily employed in connection with this generator which is charged thereby, and when the generator is not in operation, the battery is used for supplying the current to the said translating devices, and when the generator is in operation the battery and generator are often jointly in circuit with the translating devices. A cut out switch is provided so that the generator may be removed from the circuit whenever desired. The operator will occasionally desire to know the voltage available in the circuit, and will more often desire to know the rate of charge or discharge of the battery circuit and cut the generator in or out of circuit, or vary its electromotive force or correct troubles as required by the conditions. By our invention, we are enabled by means of a single instrument with appropriate connections to make the desired measurements, and by our preferred form we also secure the advantage of maintaining the circuit of the translating devices always closed irrespective of whether the instrument is giving a voltage reading or a current reading. These and other objects and advantages of our invention will be understood by those skilled in the art from the following description and accompanying drawings illustrating one form of our invention.

Figure 1 is a plan view of the instrument with the cover plate and scale removed; Fig. 2 is a sectional view on the line 2—2 and showing in part a side elevation; Fig. 3 is a sectional view showing the change switch construction in detail; Fig. 4 is a plan view of the instrument and illustrating the connections of an external circuit thereto; Fig. 5 is a diagram indicating the interior connections of the instrument as well as the connections of the external circuit, and Fig. 6 is a detail showing scale of the instrument graduated in volts and amperes.

The instrument used may be of any suitable form of construction and in the present instance is shown as comprising a main frame 5 and cover plate 6 containing a permanent magnet 7 having pole pieces 8, 8 attached thereto. The magnet is fixed to a frame support 9 which in turn is removably secured to the main frame of the instrument by screws 10. The magnet is further secured to the support 9 by screws 11 which enter the pole pieces 8. The soft iron core 12 between the pole pieces 8 is supported in fixed position from a non-magnetic cross bar 13 secured to the pole pieces, and the movable coil 14 of the instrument embracing the soft iron core 12 may be supported in any desired manner and is shown for the purpose of illustration as supported in the usual pivot bearings and as having the usual controlling springs 15 and indicating needle 16 which passes over the scale 17 supported from the support 9. Within the permanent magnet and fixed to the support 9 is a resistance coil 18 adapted to be connected in circuit with the movable coil 14 of the instrument when voltage readings are desired. The main frame 5 of the instrument is shown as having an outwardly extending hollow base portion 19 around the instrument within which we locate a conducting strip 20 adapted to form a shunt to the movable coil 14 when current values are measured.

The instrument is provided with four terminals marked 1, 2, 3 and 4, and connecting strips in the base of the instrument as indicated by dotted lines in Fig. 1 connect terminals 1 and 2 to a terminal of the shunt 20 and the remaining terminal of shunt 20 is connected by a conducting strip to terminal 3. Terminals 1 and 2 are also electrically connected to a fixed contact 21 forming one element of the change switch mounted within the base of the instrument. A spring member 22 of this switch is normally in contact with the contact 21 and is suitably supported and insulated within the base of the instrument. The member 22 is connected to one terminal of the movable coil 14 of the instrument, the other terminal of which is connected to the terminal 3. The remaining fixed member 23 of the change switch is also supported within and insulated from the base frame and is connected to one terminal of the resistance 18, the other terminal of which is connected to the main terminal 4. A push button 24 is mounted in the frame of the instrument between the terminals and engages the movable member 22 of the change switch, and when the push button is depressed by the operator, the switch member 22 will be forced from normal engagement with the fixed contact 21 and into engagement with the member 23.

When the switch member 22 is in normal position against contact 21, the movable coil and indicating needle will be caused to deflect in accordance with the strength of current passing through the external circuit because the coil 14 will be subjected to the drop of potential in the shunt 20 which drop will be proportional to the strength of the current to be measured, and when the push button is depressed the switch member 22 breaks contact with the fixed contact 21 and closes contact with the member 23 which will connect the resistance 18 in series with the movable coil 14 and the deflection of the latter will be proportional to the difference in potential between the terminals 3, 4, thus giving a measurement of voltage.

Considering now the connection of the instrument to the generator, battery and translating devices of an automobile as above referred to, Figs. 4 and 5 indicate the generator at 25, the storage battery 26, the translating devices 27, and a cut out switch for the generator at 28. The battery is shown as connected between the terminals 3, 4 and from one terminal of the battery, connection is made through the translating devices to the terminals 1, 2 of the instrument and thence through shunt 20 to terminal 3. The positive terminal of the generator is connected to the positive terminal of the battery and to one of the leads supplying the translating devices and the negative terminal of the generator is connected to terminals 1, 2 through the cut out switch 28.

By following the connections of Fig. 5 with the change switch of the instrument in the normal position as shown, it will be seen that the connections are such that the shunt 20 and movable coil 14 are in series with the battery and translating devices and the instrument will therefore always indicate the value of the current flowing through the battery. The value of the current flowing through the battery is an important consideration in order to indicate the reading of charge or discharge of the battery. This form of connection will therefore show the discharging current from the battery when translating devices are supplied thereby, and when the generator is charging the battery, this form of connection will indicate the charging current. When the switch member 22 is forced into engagement with the member 23, the instrument would then indicate the voltage between terminals 3, 4 to which the battery is connected. It will be noted that the circuits of the battery, generator and translating devices are not affected by the operation of the instrument switch with the arrangement of connections as described, and this is very advantageous in avoiding any interruption of current supplied to the translating devices, or any interruption of the circuit when the generator is charging the battery. The instrument scale is graduated to read either amperes or volts according as to whether or not the push button is depressed. As the direction of current flow through the battery circuit is opposite during discharge to that during charge, the ampere scale gives indications on both sides of the zero reading, one for discharging and the other for charging of the battery. Voltage readings are however always in the same direction and therefore the voltage readings are always on one side only of the zero reading, as shown in Fig. 6.

It will be understood that our invention may be embodied in various forms of apparatus and in various forms of circuit connections without departing from the scope of the claims.

Having thus described our invention, we declare that what we claim as new and desire to secure by Letters Patent, is,—

1. The combination of a combined ampere meter and volt meter, an external circuit, a shunt connected therein, a resistance, one end of which is permanently connected to said external circuit, the other end of which resistance is adapted to be connected to the exciting coil of said instrument; and means operable at will for connecting the exciting coil in circuit either across said shunt or to said other end of the resistance and across said external circuit and thereby disconnecting the other connection for obtaining ampere and volt readings respectively without interrupting the external circuit.

2. The combination of a combined ampere meter and volt meter, an external circuit, a shunt connected in said circuit, a resistance, one end of said resistance being permanently connected to one side of said circuit, the other end of said resistance being adapted to be connected to the exciting coil of said instrument; and means operable at will for connecting the exciting coil either across said shunt or with said other end of the resistance and to another side of the line and thereby disconnecting the other connection for obtaining ampere and volt readings respectively without interrupting the external circuit.

3. The combination with an electrical measuring instrument, of an external circuit, a shunt, a resistance, and means operable at will for connecting the movable coil of said instrument in circuit with either said shunt or said resistance and thereby disconnecting the other connection without interrupting the external circuit.

4. An electrical measuring arrangement comprising in combination an exciting coil, a magnetic element in magnetic relation to said coil, indicating means controlled by said coil, scale designations graduated in volt and ampere readings, a shunt, a terminal connected to one end of said coil and to one end of said shunt, a resistance, a second terminal connected to one end of said resistance, a conductor connected to the remaining end of said resistance, a second conductor connected to the remaining end of said shunt, and means for connecting the remaining end of said coil to either said first named conductor or said second named conductor and disconnecting the other.

5. An electrical measuring arrangement comprising in combination an exciting coil, a magnetic element in magnetic relation to said coil, indicating means controlled by said coil, scale designations graduated in volt and ampere readings, a shunt, a terminal connected to one end of said coil and to one end of said shunt, a resistance, a second terminal connected to one end of said resistance, a conductor connected to the remaining end of said resistance, a second conductor connected to the remaining end of said shunt, and unitary means for connecting the remaining end of said coil to either said first named conductor or said second named conductor and simultaneously disconnecting the other.

In testimony whereof we affix our signatures, in the presence of two witnesses.

HARRY I. SHIRE.
HORACE D. BEAN.

Witnesses to signature of Harry I. Shire:
L. K. SAGER,
GEO. A. HOFFMAN.

Witnesses to signature of Horace D. Bean:
CHAS. F. WILDE,
CORA W. BLODGETT.

Copies of this patent may be obtained for five cents each, by addressing the "Commissioner of Patents, Washington, D. C."